U S009720582B2

United States Patent
Baldwin et al.

(10) Patent No.: US 9,720,582 B2
(45) Date of Patent: *Aug. 1, 2017

(54) RESPONSIVE IMAGE RENDITION AUTHORING

(71) Applicant: International Business Machines Corporation, Armonk, NY (US)

(72) Inventors: Nicholas A. Baldwin, Gladesville (AU); Mark C. Hampton, Fitzroy North (AU); Jon M. Harris, Raleigh, NC (US); Stefan A. Hepper, Morgan Hill, CA (US); Eric Martinez de Morentin, Manly (AU)

(73) Assignee: International Business Machines Corporation, Armonk, NY (US)

( * ) Notice: Subject to any disclaimer, the term of this patent is extended or adjusted under 35 U.S.C. 154(b) by 75 days.

This patent is subject to a terminal disclaimer.

(21) Appl. No.: 14/694,035

(22) Filed: Apr. 23, 2015

(65) Prior Publication Data

US 2016/0071237 A1 Mar. 10, 2016

Related U.S. Application Data

(63) Continuation of application No. 14/479,447, filed on Sep. 8, 2014.

(51) Int. Cl.
*G06F 17/22* (2006.01)
*G06F 3/0484* (2013.01)
(Continued)

(52) U.S. Cl.
CPC ........ *G06F 3/04845* (2013.01); *G06F 17/227* (2013.01); *G06F 17/30893* (2013.01); *G06T 3/40* (2013.01)

(58) Field of Classification Search
CPC .. G06F 17/211; G06F 17/218; G06F 17/2247; G06F 17/248
(Continued)

(56) References Cited

U.S. PATENT DOCUMENTS 7,574,653 B2    8/2009   Croney et al.
7,594,166 B1    9/2009   Ramakrishna et al.
(Continued)

OTHER PUBLICATIONS

Jim Buyens; Microsoft Office FrontPage 2003 Inside Out; Sep. 3, 2003; Microsoft Press; pp. 2-30, 231-268, and 570-604.*
(Continued)

*Primary Examiner* — Andrew Dyer
(74) *Attorney, Agent, or Firm* — Scully, Scott, Murphy & Presser, P.C.; Reza Sarbakhsh

(57) ABSTRACT

A method may include receiving a first input containing a markup language file, an image, and a style sheet file having breakpoints and image display rules for generating image renditions of the image. The method may further comprise displaying a first image rendition based upon the breakpoints and the image, the first image rendition having the first image and crop borders corresponding to the breakpoints. The method may further comprise receiving an input indicating modification of the image rendition, and displaying a second image rendition based upon the modification to the first image rendition. The method may further comprise amending the markup language file with at least one image display rule based upon the second image rendition, the at least one image display rule conforming to the first set of image display rules.

7 Claims, 6 Drawing Sheets

(51) Int. Cl.
*G06F 17/30* (2006.01)
*G06T 3/40* (2006.01)

(58) Field of Classification Search
USPC .............. 715/234, 235, 236, 238, 243, 252
See application file for complete search history.

(56) References Cited

U.S. PATENT DOCUMENTS

| | | | | |
|---|---|---|---|---|
| 8,965,869 | B2* | 2/2015 | Rosado | G06F 17/3089 |
| | | | | 707/706 |
| 2002/0025085 | A1* | 2/2002 | Gustafson | G06Q 30/06 |
| | | | | 382/311 |
| 2003/0072486 | A1* | 4/2003 | Loui | G06T 11/60 |
| | | | | 382/175 |
| 2004/0117735 | A1* | 6/2004 | Breen | G06F 17/30905 |
| | | | | 715/202 |
| 2005/0005028 | A1 | 1/2005 | Huang | |
| 2005/0134900 | A1* | 6/2005 | Kuwata | H04N 1/3871 |
| | | | | 358/1.15 |
| 2007/0055690 | A1* | 3/2007 | Giannetti | G06F 17/248 |
| 2007/0118438 | A1* | 5/2007 | Long | G06Q 30/0633 |
| | | | | 705/26.8 |
| 2008/0209311 | A1* | 8/2008 | Agronik | G06T 11/60 |
| | | | | 715/234 |
| 2010/0107047 | A1* | 4/2010 | Amsterdam | G06F 17/30887 |
| | | | | 715/208 |
| 2010/0107091 | A1* | 4/2010 | Amsterdam | G06F 17/3089 |
| | | | | 715/760 |
| 2011/0167333 | A1* | 7/2011 | Sakata | G06F 17/3089 |
| | | | | 715/234 |
| 2013/0111324 | A1 | 5/2013 | Kern et al. | |
| 2013/0120389 | A1 | 5/2013 | Moguillansky | |
| 2013/0218858 | A1* | 8/2013 | Perelman | G06F 17/30268 |
| | | | | 707/706 |
| 2013/0219024 | A1 | 8/2013 | Flack | |
| 2014/0359405 | A1* | 12/2014 | Hou | G06F 17/30905 |
| | | | | 715/202 |
| 2016/0070814 | A1 | 3/2016 | Baldwin et al. | |

OTHER PUBLICATIONS

Christopher Barnatt; Hardware; Feb. 2, 2014; ExplainingComputers.com; pp. 1-9.*

Mastykarz, W., "Responsive Image Renditions with SharePoint 2013," Jan. 24, 2013, Copyright© 2007-2013 Waldek Mastykarz. http:i/blog.mastykarz.nl/responsive-image-renditions-sharepoint-2013/, 11 pages.

Nandorf, J., "Responsive Web Design," Evaluation of Techniques to Optimize Load Time, UMEA University, Bachelor Thesis, Spring 2013, 17 pages.

Sypek, J., "Fulfilling the promise of Responsive Design with SharePoint 2013," A session at SharePoint Saturday NYC 2013, Jul. 27, 2013, 2 pages.

List of IBM Patents or Patent Applications Treated as Related, dated Dec. 23, 2016, 2 pages.

Office Action dated Oct. 26, 2016 received in U.S. Appl. No. 14/479,447, 18 pages.

* cited by examiner

RESPONSIVE IMAGE RENDITION AUTHORING

BACKGROUND

Responsive web design can assist web page authors to create web pages that can be rendered by web browsers on computer devices with a wide variety of display sizes and resolutions. Markup languages, e.g., hypertext markup language (HTML) or Extensible Markup Language (XML), and style sheet files, e.g., cascading style sheet (CSS) files or extensible style sheet language transformations (XLST) files may contain page content and display instructions, respectively, that allow computing devices to display web pages to readers.

Cascading style sheet files can include instructions that direct web browsers to render web page content using particular predetermined fonts, font sizes, colors, borders and other web page formatting, as well as formatting instructions regarding the display of images on web pages, including the position, orientation, and scaling of images. Cascading style sheet files may also contain media queries that have breakpoints (spatial limits such as display size or browser window size) to indicate that a particular set of formatting instructions should be used to display the web page within those spatial limits. When rendering a web page, a computing device may parse the style sheet file and, responsive to a spatial limit falling within a range of media query breakpoints, select the formatting instructions within the media query to render the web page. Web content management systems provide web page authors with a user interface to assist in the creation of web pages and cascading style sheets that direct web page rendition by web browser software on a computing device. Web content management systems may use templates with predefined display rules and may provide access to stored images in order to assist web page authors perform their work.

Manual editing of cascading style sheets may present difficulties to web page authors when attempting to adjust the presentation of images on digital devices with a wide variety of display sizes and resolutions. The present disclosure relates to methods and systems for authoring web pages, and more specifically, to the use and application of rules within cascading style sheets to a rendered web page that instruct how to appropriately select and render various image representations on multiple displays having sizes and resolutions.

SUMMARY

A method of amending a markup language file to include page display instructions. The method may include receiving a markup language file, and a style sheet file containing breakpoints and at least one set of image display rules for generating image renditions of a first image. The method may further comprise displaying a first image rendition based upon the first image and the breakpoints, the image rendition having crop borders that correspond to the breakpoints. The method may also comprise receiving an input indicating a modification to the image rendition and displaying a second image rendition that includes the modification. Finally, the method may include amending the markup language file with at least one image display rule based upon the second rendition, the image display rule conforming to the set of image display rules.

A system for authoring web pages may include: a computing device with a storage medium storing a markup language file, and a style sheet file containing breakpoints and a set of image display rules for generating image renditions of a selected image; a graphics processor configured to display an image rendition (corresponding to the breakpoints) for the selected image, having the image and crop borders corresponding to the breakpoints, and further to display a further image rendition that includes at least one modification to the image rendition received from a user input device. The system may also include a user input device configured to receive an input indicating the modification to the image rendition; and a processor configured to amend the markup language file with at least one image display rule based upon the further image rendition.

A computer program product for authoring web pages may comprise a computer readable storage medium having stored thereon, and first program instructions executable by a computing device to cause the computing device to: receive a markup language file, and a style sheet file containing breakpoints and at least one set of image display rules for generating image renditions of a first image; display a first image rendition based upon the first image and the breakpoints, the image rendition having crop borders that correspond to the breakpoints; receive an input indicating a modification to the image rendition; and to display a second image rendition that includes the modification. Finally, the first program instructions may cause the computing device to amend the markup language file with at least one image display rule based upon the second rendition, the image display rule conforming to the set of image display rules.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
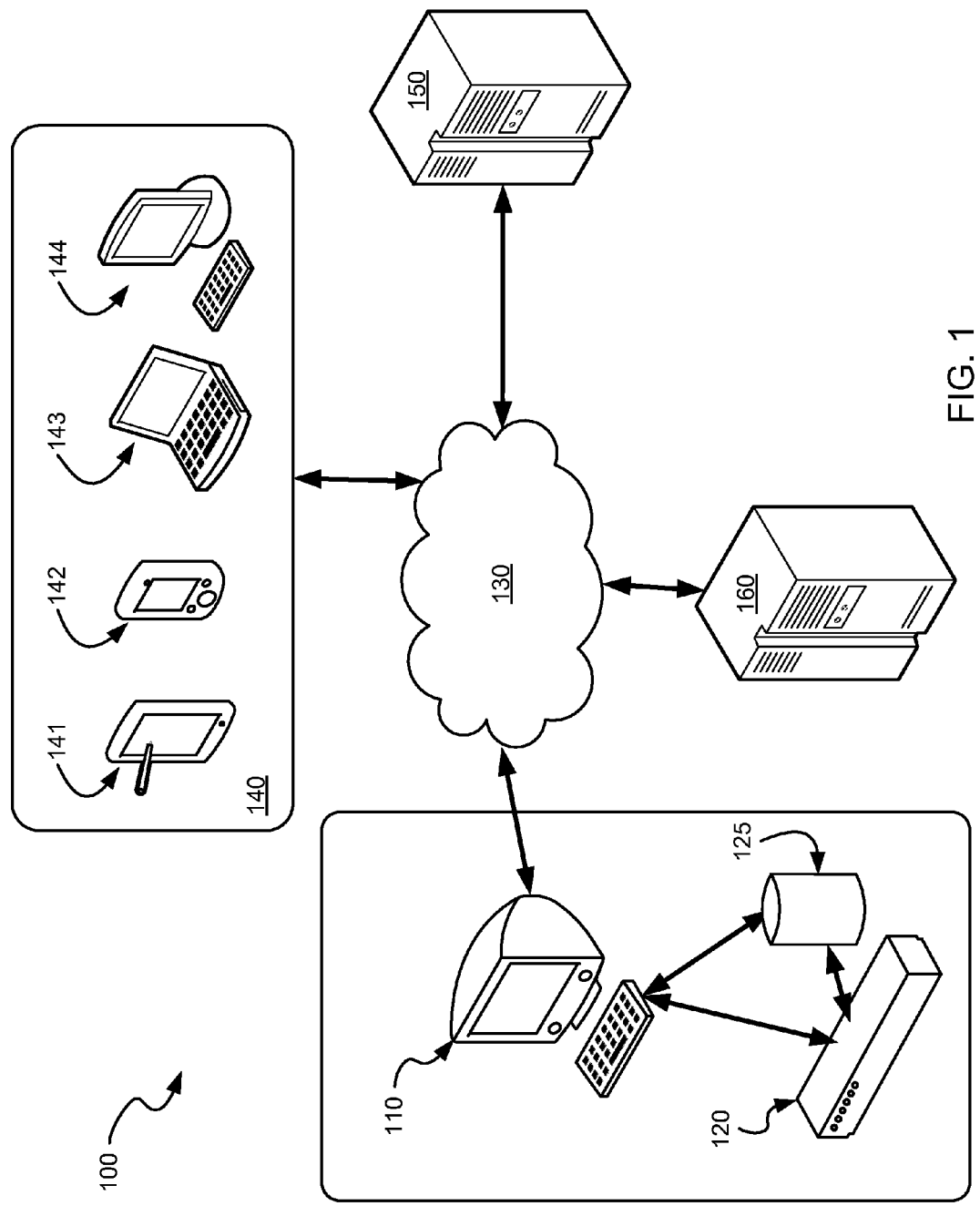
FIG. 1 depicts a web authoring system that can present images and crop boundaries for different size device screens to an author and apply appropriate rules from a cascading style sheet file configured to portray a web page on computer device displays with multiple sizes, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to web page authoring, and more particular aspects relate to integrated development environments for web page creation. While the present disclosure is not necessarily limited to such applications, various aspects of the disclosure may be appreciated through a discussion of various examples used in this context.

The process of authoring and formatting webpages becomes more complex with increasing numbers of device types that can access and display a web page. The difficulty of coordinating the clear rendering a single image on devices ranging from smart phones and tablet computers to laptops desktop computers with high resolution displays highlights the importance of scaling and cropping images included on a webpage. Responsive web design can somewhat simplify the process of authoring a webpage, but still involves human input to determine how best to crop and scale images on webpages. Embodiments of the present disclosure are directed toward partially automating the presenting and manipulating of images to an author when creating a web page that can control the display of selected images on computer device displays according to various responsive web design breakpoint limits and image display rules.

Various embodiments are directed toward a system that can provide a user interface that presents an author with a representation of how a set of image renditions for a particular image would be represented. The user interface provides options for the author to adjust how an image is displayed. In particular embodiments, the user interface can include a set of options (or 'strategies') that can be selected in order to change how the image is displayed. The user interface can also be configured to allow the author to select an alternate image. In certain embodiments, the set of options can be specified in an image style sheet that defines the image fitting strategies that can be applied.

According to embodiments, each fitting strategy can have minimum/maximum sizes defined, as well as strategies for scaling (width vs. height) and cropping (left, center, right). The user interfaces can access the style sheet and enumerate the available strategies classes so that an author can view the ways the image might be presented (e.g., showing colored boxes overlaid on the image for different strategies). The author can then selecting an option which represents a 'strategy' for presenting an image (e.g. crop OR scale and then settings for the option). The system then uses the selection to determine which rules should be applied. The rules themselves, however, can already have been specified (by a designer) within the style sheet file (e.g., the system accesses the style sheet files or rules and the author does not create them during the selection process). For purposes of this application, discussion will refer to hypertext markup language (HTML) files and cascading style sheet (CSS) files, although other markup languages such as Extensible Markup Language (XML) and other types of style sheets such as extensible style sheet language transformations (XLST) files may also be used.

In particular embodiments, the selected rules can be applied by modifying a hypertext markup language (HTML) file so that the file contains the selected rules. As discussed herein, the source of the rules can be a CSS file, and the system can automatically generate the relevant HTML code to apply the rules to the specific image being reviewed. For example, this could be done by using a markup pattern such as: <div class="imageDecoration imageStrategy"><div class="imageCrop"><img></div></div> In such an example, scaling and offsetting can be done on the img tag itself, cropping can be done on the imageCrop container tag, decoration can be done on the imageDecoration container tag and the "strategy" classes can define what type of image fitting strategy to employ—like auto-width, auto-height, left crop, etc.

Accordingly, the base image rendition can be reused across multiple pages or even multiple spots on the same page by adjusting the resolution for the targeted device or for the different locations on the webpage. The image fitting strategy defines how a specific rendition will be modified between responsive breakpoints. By way of the user interface, the author can view a proposed set of strategies and either modify those strategies or create a new rendition for a specific usage.

FIG. 1 shows a system 100 in which responsive image rendition software, or authoring software, can read and save formatting instructions that facilitate clear and legible display of web page images on a wide variety of networked devices according to aspects of the present disclosure. A computer 110 may amend hypertext markup language (HTML) markup specifying appropriate rules to apply from a cascading style sheet (CSS) file on a storage medium 125 in the computer 110, on a remote device 120, or on a web server 150 in preparation for providing web page content to a user on the computer 110 or a networked device 140 that requests such content. The web page content may include the HTML file, a cascading style sheet file, sound files, image files, and other page content.

The computer 110, which may be a device such as a desktop computer, laptop computer, or a networked client terminal, may run authoring software that can receive images to be included in a web page. These images may be manually loaded into the software by, e.g., a manual file upload by a user using the computer 110, in response to a user-initiated file transfer from a networked computer device 160, or by a digital asset management system operating on the computer 110 or a computer accessed via a network 130. The computer 110 may contain a rendering module specifically configured to first, for a given web page and breakpoint (or set of breakpoints) within a media query, receive selected images and second, overlay crop borders onto each image rendition identifying how an image may be displayed at different screen widths for the associated breakpoint before thirdly, showing the image rendition to a user who may be authoring a cascading style sheet file on the computer 110. The system may then update and re-display both the selected image and crop borders, if it has received instructions to modify the image rendition, by creating an additional rendition or selecting an alternative image display strategy.

The computer 110 can receive an input with relevant webpage data such as a hypertext markup language file, at least one image, and a cascading style sheet with breakpoints, an initial set of image display rules and image display parameters. Once received, the software may use media queries with associated breakpoints and image display rules in order to create image renditions for a user to select or to edit. The media query may provide an upper breakpoint and a lower breakpoint, within which limits an initial set of image display rules may instruct a computing device on how to render an image. Media queries in the cascading style sheet file may have breakpoints based upon common device display sizes, but the breakpoints and the image renditions based upon those breakpoints may sometimes be adjusted manually to accommodate particular needs of the web page design process.

A web authoring system can use image display strategies to adjust the image rendition to accommodate the displays. For instance, the system can present an author with a preview of an image rendition and strategy for one or more displays. They author may seek to change the strategy by selecting from available strategies provided by a user interface. The strategies can result in changes to how the image is displayed (whether larger, smaller, different aspect ratio, or having a different resolution, etc. . . . ). The author may select multiple image display strategies to apply to a single image rendition; however, for ease of discussion various example scenarios are discussed herein as using a single strategy.

Image display strategies may include various image display rules, not limited to: crop rules, image scaling rules, and image size rules that adjust how images are trimmed, scaled, and the size of images on a page. Image renditions may follow the rules of image display strategies in order to accommodate displaying the web page on displays with different sizes, resolutions or aspect ratios without having to perform an image rendition analysis for each individual display size available to users of computing devices that read web pages.

One image display strategy may be to expand the border of a cropped image to show more of the image on larger displays than those that match the initial setting of the image display rules. The crop rule image display strategy may include instructions to expand the crop border of an image toward the left side of the image, toward the right side of the image, toward the top of an image, or to expand the crop border on multiple sides while retaining an origin reference point associated with the image constant relative to the other web page content. Other image display strategies may include displaying an image with a predetermined minimum or maximum size on the web page, or using a scaling rule that adjusts the width (only), height (only), or both the width and height of an image for displays with different sizes than the sized associated with the initial image rendition and breakpoint.

If a user has changed an image display strategy, selected a new image, or both, the authoring software can then create a new image rendition and to amend markup within the hypertext markup language (HTML) file to include appropriate image display rules for the new image rendition. The amended HTML file may then be stored on a computer 110, an attached storage device 120, or a networked computing device such as a web server 150. A plurality of networked devices 140 may then access and display the final web page by downloading web page data that may include the HTML file, images, and the cascading style sheet file. The plurality of networked devices may include tablet computers 141, smartphones 142, notebook computers 143 and desktop computers 144 with displays that have different aspect ratios, pixel counts, and resolutions.

Figure 2:
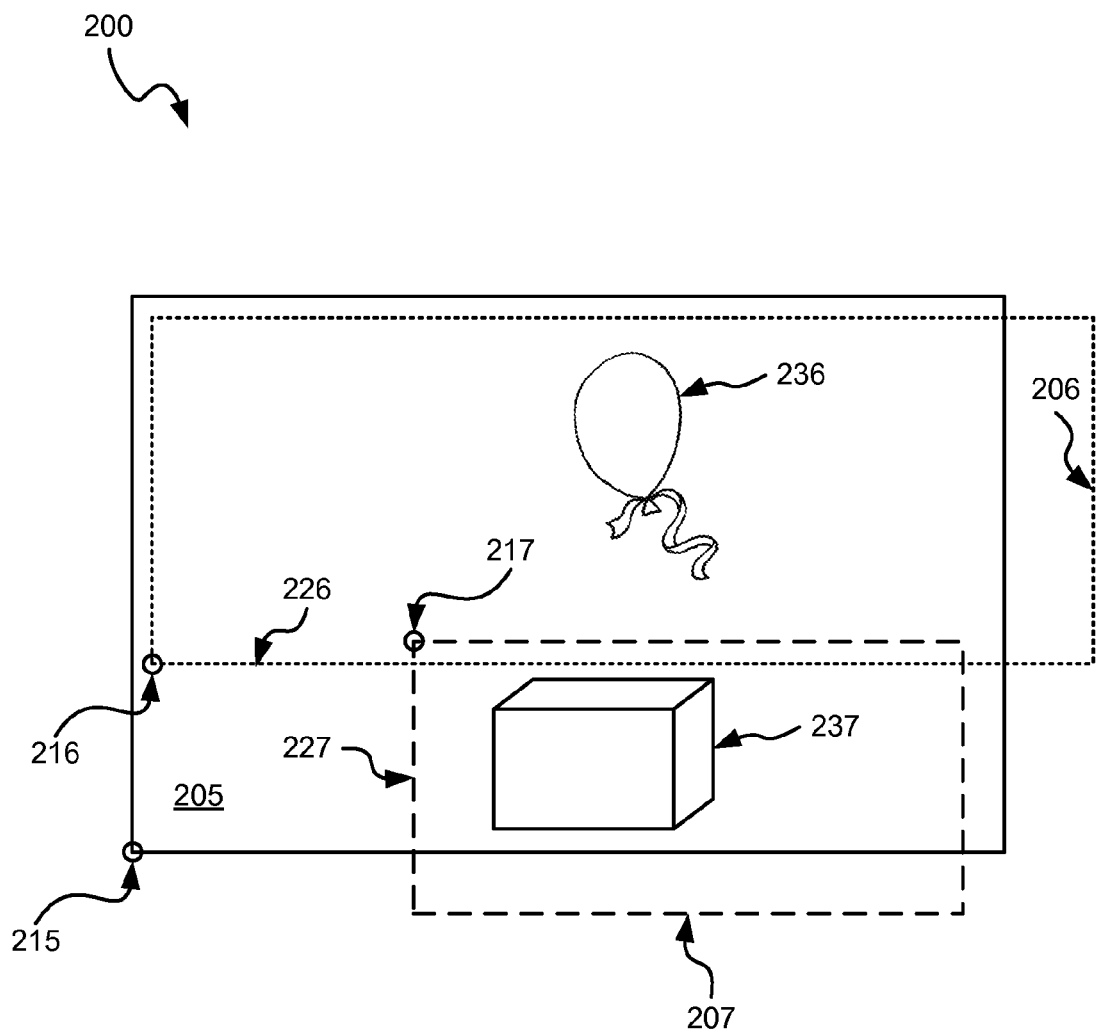
FIG. 2 shows elements of an image rendition created by authoring software, according to aspects of the present disclosure.

FIG. 2 shows an embodiment of an image rendition 200 as it may be presented to a user of responsive image rendition authoring software. The image rendition 200 may contain a selected image 205 that can be included with an HTML file and eventually displayed on a web page or rendered with other content in a page preview. A first crop border 206 and a second crop border 207 may at least partially overlay the selected image 205, indicating the portions of the selected image that can be shown on the page for devices with large and small displays that fall within the breakpoint limits of a device class. The selected image, the first crop border, and the second crop border may each have a separate length and a separate height that can be used to calculate the respective areas of the selected image, the first crop border, and the second crop border. The portion of the selected image 205 encompassed by the first crop border 206 may be used with image renditions associated with one breakpoint, while the portion of the selected image 205 encompassed by the second crop border 207 may be used with image renditions associated with another breakpoint.

As described herein, crop rules may be among image display strategies that regulate how an image, as rendered on a web page, may alter as the device display changes size from an initial size, whether the changes are toward larger or smaller display sizes. Crop rules may indicate that a crop borders will expand on one side, two sides, or multiple sides, as display sizes used to render the image increase/decrease. Other image display rules may indicate how the displayed image is to alter between the image rendition associated with the first crop border/breakpoint and the image rendition associated with the second crop border/breakpoint. In other embodiments, image display strategies may specify that an image rendition associated with a single breakpoint may scale proportionally from a single image rendition associated with a single breakpoint as the image is displayed on displays larger or smaller than the device display associated with the initial breakpoint and image rendition.

The selected image 205 may have an origin reference point 215 that may be located at a vertex of the image or at an interior point of the image such as the center point. The first crop border 206 and the second crop border 207 may have a first crop border reference point 216 and a second crop border reference point 216, respectively, that can be used to determine the position of a crop box relative to the origin reference point 215 as well as to adjust the position of a crop border relative to the origin reference point. The origin reference point and a crop border reference point may have a measurable offset, such as can be described using Cartesian coordinates or by measuring an angle (from a reference line on the selected image) and a distance of a crop border reference point from the origin reference point.

The default configurations (i.e., sizes and relative positions) of crop borders and selected images in image renditions may not always product aesthetic results. Sometimes size mismatches or positional errors may occur that indicate user intervention to amend HTML files so that they can render cleanly on all desired device types. For example, under some embodiments, a first crop border horizontal edge 226 may be larger than the width of the selected image, causing the first crop border to extend past the edge of the selected image 205. When such a size mismatch occurs, it may be desirable for an author to select a new, larger image, or to adjust the size of the first crop border 206 until it does not extend past the edge of the selected image 205. In other embodiments, the second crop border 207 may have both width and height that are smaller than the width and height of the selected image 205, but may have a second crop border reference point 217 positioned such that the second crop border vertical edge 227 extends past an edge of the selected image 205. In such embodiments, it may be advisable to adjust the position of the second crop border reference point 217 in order to have the second crop border 207 remain within the area of the selected image 205.

In some embodiments, user intervention may also be desirable in order to ensure the proper placement of a first picture element 236 or a second picture element 237 within a crop border, according to the wishes of a web page author.

Accordingly, an author may position a first picture element 236 at a location within a first crop border 206, and a second picture element 237 at a second location within a second crop border 207 and, as described in FIG. 1, image display strategy rules may be selected to render the image for display sizes that will fall between the breakpoints associated with the first crop border 206 and the second crop border 207. For example, should a user or web page author choose to display an image with image scaling rules rather than image crop rules, a single crop border may be used in an image rendition to show the portion of the image that can be displayed as part of the web page. The user or web page author may be able position the crop border and to adjust its size and proportions for an initial image rendition at one breakpoint for the image on the web page. The user may then indicate the degree to which the image may scale as a percentage of the image size, as a fraction of the web page width, or with a numerical limit that would indicate a maximum or minimum size for the image, depending on whether the breakpoint used for the initial image rendition was an upper or lower breakpoint limit.

Figure 3:
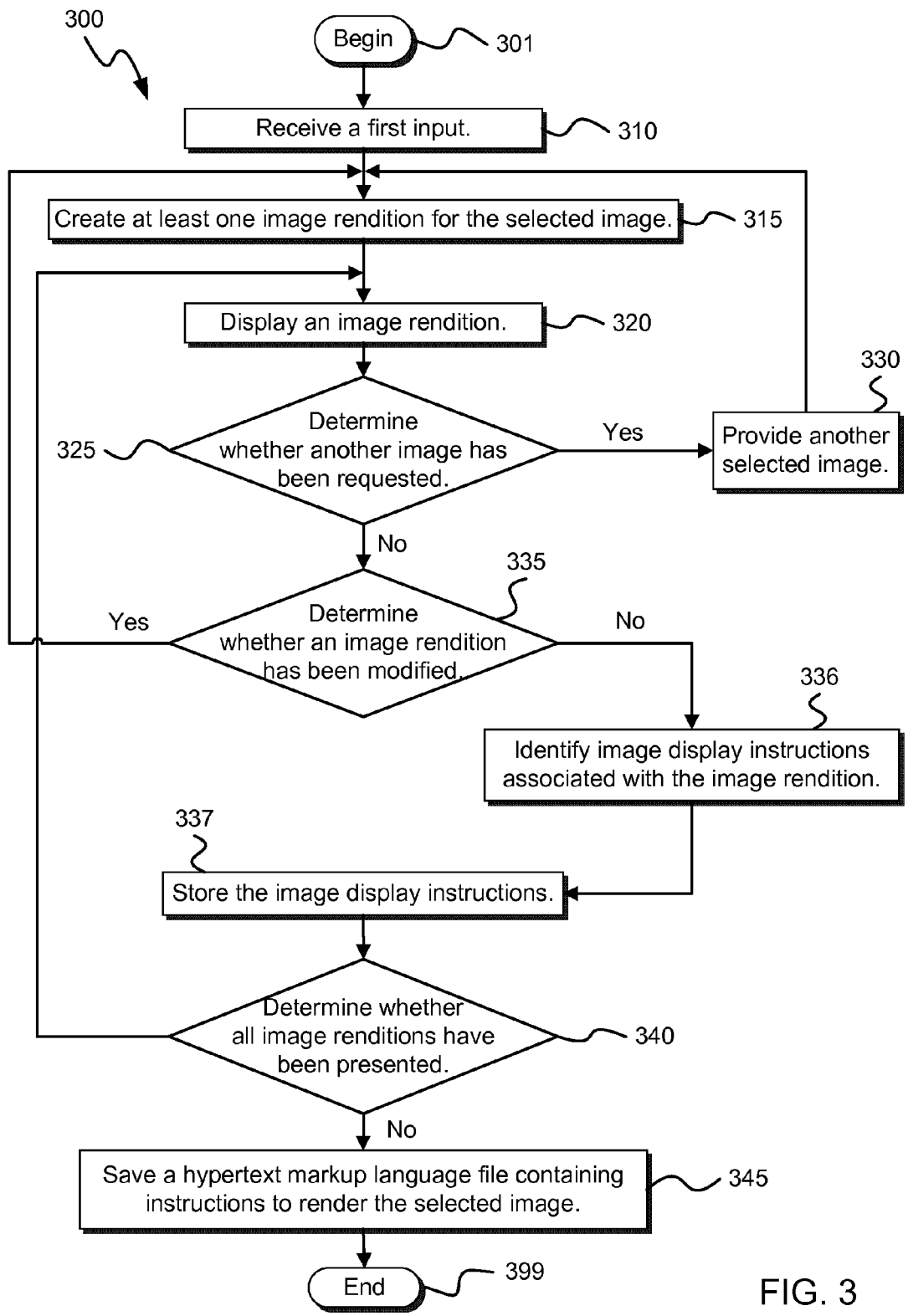
FIG. 3 shows a method of using a web authoring system to apply rules from a cascading style sheet file according to aspects of the present disclosure.

FIG. 3 describes a method 300 of creating, manipulating, and saving image rendition instructions in HTML files according to aspects of the present disclosure. The method begins in block 301. The system or authoring software may receive a first input, as shown in block 310, that may include a hypertext markup language (HTML) file, a cascading style sheet (CSS) file, and at least one image. Other types of computer-readable files may also be used in web pages and may be included in embodiments of the invention. Examples of such other files may include Javascript™ or other computer language files and audio or video recordings. The HTML file, the CSS file, and the image may be received from a folder on a computer hard drive or other storage media, or from storage media on a remote (networked) computer, or from a portable electronic device such as a digital camera, tablet computer, or camera-equipped smartphone. The selected image may also be received from a digital asset management (DAM) system that can assist authors of web page content with finding and using stored images on a web page and ensuring that such images are used with appropriate credit to the image creator or copyright holder. Particular embodiments may include providing the HTML file, the CSS file and at least one image from a single source, such as the previously-mentioned digital asset management system, networked to the computing device where the authoring software is being operated, while other embodiments may receive individual files from different sources attached to or stored within the computing device.

The CSS file may include breakpoints for transitioning between image display rules and image display strategies associated with the image (rendered as part of a web page) on computing device displays having different sizes. The CSS file and associated breakpoints, image display rules and image display strategies may be pre-programmed as part of the authoring software, may be stored in a digital asset management system, or on a remote computer, or may be manually loaded by an author. With the selected image and the applicable breakpoints, at least one image rendition for the selected image may be created based upon the breakpoints received in the first input to the system, as described in block 315. It may be possible to create image renditions for each breakpoint or set of breakpoints that may control display of the image.

Image renditions may be displayed to an author or user of the software, as described in block 320. The software may present to an author a user interface that contains an image rendition based upon the contents of the first input. The software may also present information about the image rendition (such as the breakpoint limits that apply to the rendition) or that may be acted upon by the author. For example, the user interface may include information such as image display strategies that an author may select to apply to an image rendition between its associated breakpoint limits. Image display strategies may be presented in a user interface sidebar or a separate program window, with an option to select one or more image display strategy to be applied to the image rendition. The user interface may also include boxes or fields where an author can provide information to the program about limits that may apply to the image display strategies such as a maximum size, a minimum size, and a direction (such as for crop rules where the crop border shifts). The displayed image rendition may then be assessed by an author or user in order to determine whether a crop border needs to be resized, relocated, or left alone, and whether an image display rule or strategy may be applied to the image rendition. The system may further determine whether, in response to an input, a new image has been requested or selected (from the same source or a different image source), as shown in block 325. The user interface may provide an author with a separate window from which to browse among or to search and select a new image for creating new image renditions for a web page. The user interface may provide an author with fields where information about new images may be specified in order to improve searching and selection. Such information may include image size, color content, subject matter (especially if searching within a digital asset management system), and licensing permissions associated with images. In particular embodiments, a new image may be selected when the image received in the first input and one or more of the crop borders have a size mismatch problem or when the application of an image display strategy to an image creates an unaesthetic result. The authoring system may provide another selected image, as shown in block 330, before repeating the steps of creating an image rendition, displaying the image rendition, and the determining step, as shown in blocks 315, 320, and 325 respectively and determining whether another image should be selected and supplied, as described in block 325. Another image may be provided as described in block 330.

When no other image has been requested, the software may determine whether an input to modify the image rendition has been received, as shown in block 335. Image modifications may come in several form, including: selecting or applying a scaling rule for an image, selecting an image size rule (i.e., a maximum size or a minimum size for an image as displayed on a rendered web page), selecting or applying a crop rule, and modifying crop borders. The software may read image display strategies and image display rules from a source such as the cascading style sheet received with the first input to display the image display strategies in a part of the software user interface. When an author has accepted an image for an image rendition, the author may select from the user interface an image rendition and apply a selected image display strategy to that image rendition. For example, when applying an image display strategy to an image rendition, an author may select an image crop border associated with the smaller of two breakpoints with an image rendition as the baseline image. The author may then select an image display strategy, such as "scaling the image," to apply to that image rendition. The author may provide information to the software via the user interface specifying that the image can be scaled a certain amount before reaching the other breakpoint limit. Finally, the author may then approve the application of the image display strategy to the image rendition, whereupon the software may save the image display instructions. Image display instructions may include the image used to create the image rendition (or a link to the image), the dimensions of image crop borders within the image rendition, the image scaling strategy that applies to the image rendition, and HTML code that may be generated by the software that may be intended for inclusion in the HTML file.

Direct manipulation of the image rendition may occur by making modifications to one or more of the image crop borders in the image rendition, including altering the width of a crop border, altering the height of a crop border, and altering the position of a crop border reference point, according to the user's request. Other embodiments of the present invention may also include crop borders with altered shapes (i.e., not rectilinear, but circular, oval, or some other shape). Modification of a crop border may trigger a second behavior loop in the method, prompting the creation and display of another image rendition and another determination of whether the crop border and selected image have a size mismatch problem or positional error, as described previously herein.

When, for a given image rendition, there are no further image requests or crop border changes, the user may select or decline an image display strategy that may include at least one image display rule to regulate the rendering of the image on web pages. As described in FIG. 2, Image display strategies and image display rules may include crop rules, scaling rules, and image size rules to accommodate cropping, scaling, and displaying the image on web pages rendered for device displays between the breakpoint settings associated the image rendition. The software may identify the image display instructions, including the image file, crop borders, image display strategies and image display rules, associated with the image rendition, as described in block 336 and store the image display instructions, as shown in block 337. The storing of image display instructions may be in dynamic random access memory, in a file on a nonvolatile storage medium such as a hard disk or solid state memory.

The steps of receiving images and breakpoints, creating and displaying image renditions, determining whether new images have been selected or crop border borders have been modified, and applying image scaling strategies and image display rules may be repeated multiple times, according to the number of breakpoints authoring software and the number of image renditions that the software is instructed to display to the web page author. Some embodiments of the method may contain an additional step of determining whether each image rendition that has been created using the breakpoints has been displayed to and approved by an author using the system or authoring software as described in step 340. If there remain image renditions that have not been reviewed by an author, the system or authoring software may then display another image rendition to the author and repeat the analysis loop.

Finally, the authoring software may amend a hypertext markup language (HTML) file with image display instructions to render the selected image in web pages displayed on computing devices that fall into one or more categories covered by the breakpoints, and may further save the HTML file on a hard disk or nonvolatile storage medium, as described in block 345. The method may then end in block 399.

Figure 4:
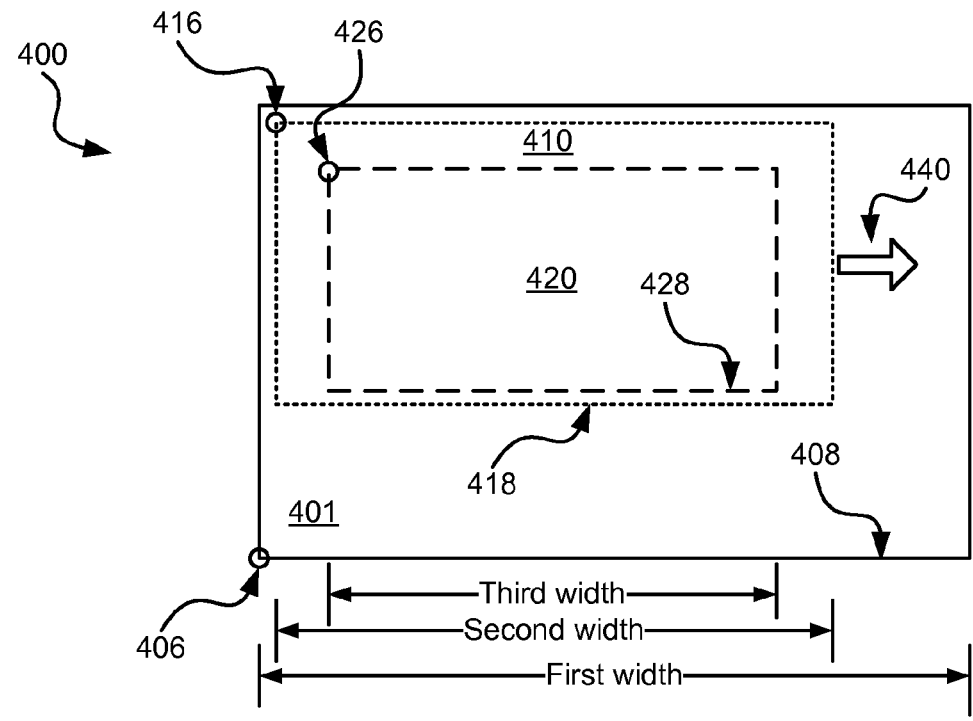
FIG. 4 shows two image renditions that reflect a change in the size of a crop border, according to aspects of the present disclosure.
Figure 4:
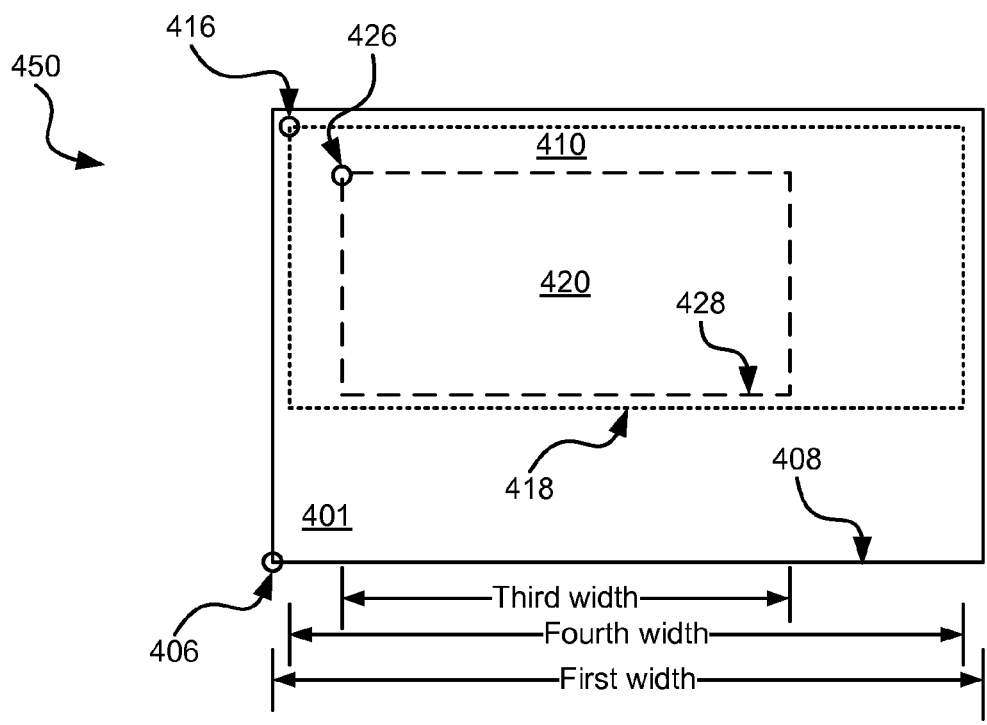

FIG. 4. shows a pair of image renditions 400 and 450, before (400) and after (450) an author may request modification of a crop border according to aspects of the present disclosure. FIG. 4 contains a selected image 401, a first crop border 410, and a second crop border 420. The selected image 401 has an origin reference point 406 and an image bottom edge 408. The first crop border 410 has a first crop border reference point 416 and a first bottom edge 418. The second crop border 420 has a second crop border reference point 426 and a second bottom edge 428. The image bottom edge 408 has a first width, the first bottom edge has a second width, and the second bottom edge has a third width.

While reviewing an image rendition, a user may provide an input to modify a first crop border 410 by, for example, moving a side of the crop border away from the first crop border reference point 416 in a first direction 440, making the first bottom edge 418 longer than before. The image rendition 450 shows the larger first crop border 410 with a fourth width, rather than the original second width. In alternative embodiments, the first bottom edge 418 may be shortened, or the bottom edges of both the first and second crop borders may be modified by increasing their widths, decreasing their widths, or a combination of increasing one width and decreasing another width. In other embodiments, the width change may be achieved by moving the side of the first crop border that has the first crop border reference point 416 at a vertex away from the opposite side of the first crop border in the first direction 440, or in the opposite of the first direction, as desired by an end user of the software. As previously described in FIG. 2, these width modifications may be useful to help position a picture element in a crop border to present the picture element more or less prominently on a web page containing the selected image. And, as described in FIG. 3, the crop borders may also show the limits of displaying an image as rendering device displays scale between the first breakpoint and the second breakpoint associated with a particular image rendition.

Figure 5:
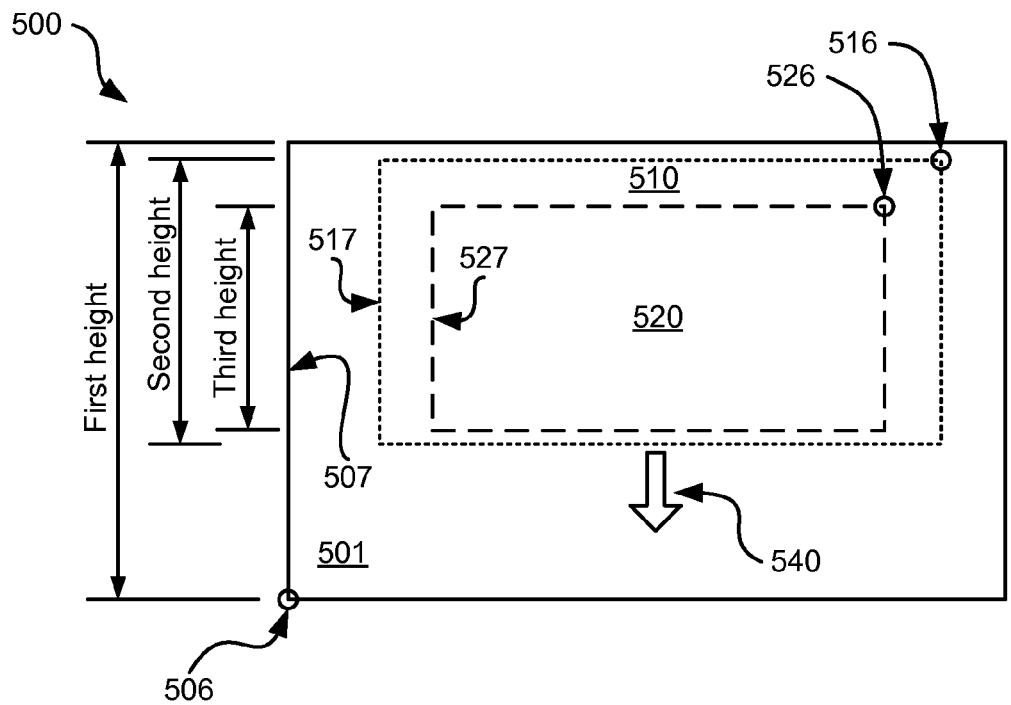
FIG. 5 shows two further image renditions that reflect a change in the size of a crop border, according to aspects of the present disclosure.
Figure 5:
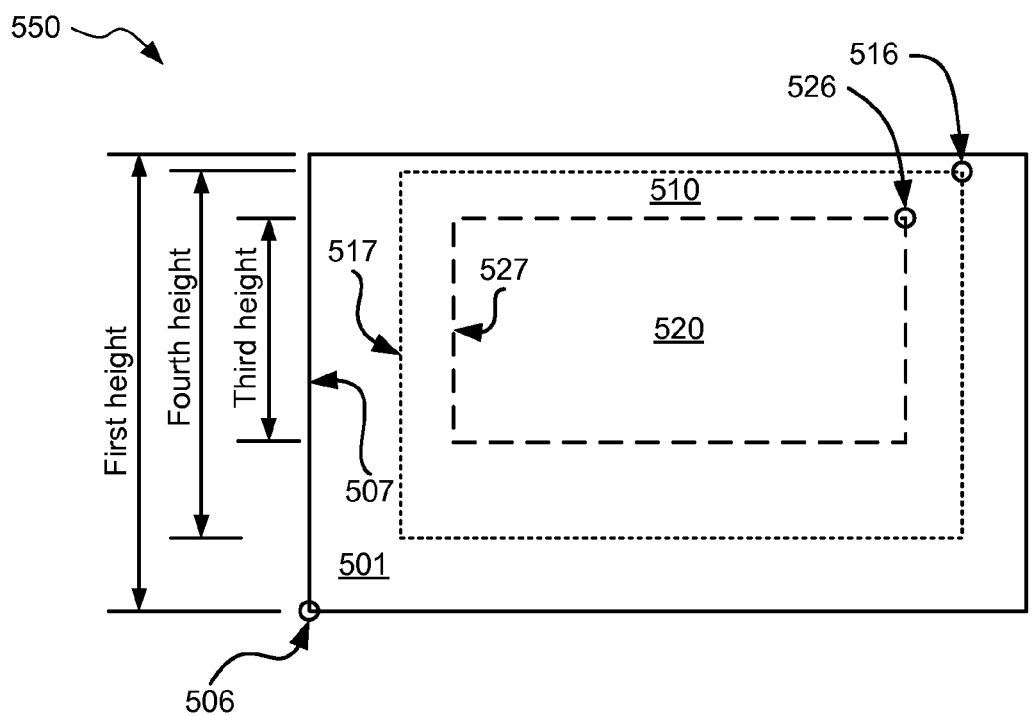

FIG. 5 shows image renditions 500 and 550 that reflect the change in height of a crop border. The first image rendition 500, before a height change, may include the selected image 501 with an origin reference point 506, which may be located at a vertex of the selected image. Other embodiments may have the origin reference point located at an interior point of the image, such as the center of the image area. The selected image 501 may have a first vertical edge 507 with a first height, the first crop border 510 may have a second vertical edge 517 with a second height, and the second crop border 520 may have a third vertical edge 527 with a third height. Upon receipt of an input from an author, the system may perform a modification of the first crop border 510 by moving an edge of the first crop border in a second direction 540, elongating the second vertical edge 517 until it has a fourth length, as shown in image rendition 550.

In alternative embodiments, the vertical and horizontal edges of a crop border may be adjusted independently. Similar to the edge length modification previously described in FIG. 4, the height of the third vertical edge 527 of the second crop border 520 may also be increased or decreased independently of the first crop border vertical edge according to requests made by the author using the system or authoring software. Edge length and height modification may also occur independent of any crop border reference point relocation relative to the origin reference point 506 as described for FIG. 2.

Figure 6:
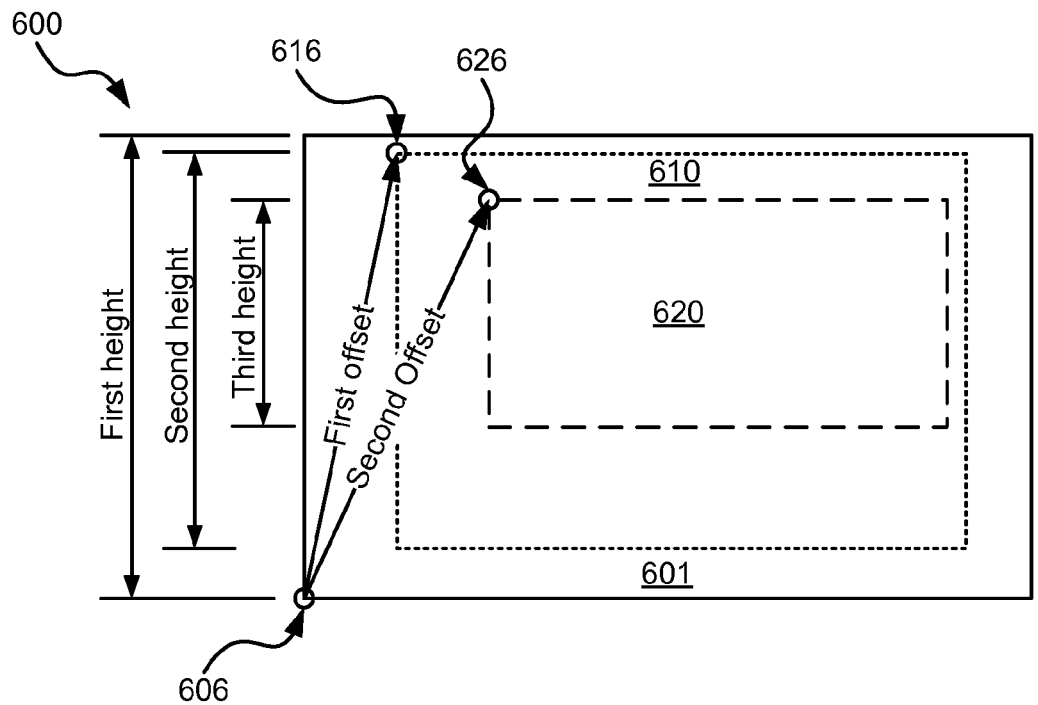
FIG. 6 shows two image renditions that reflect a change in the position of a crop border reference point with respect to the origin reference point, according to aspects of the present disclosure.
Figure 6:
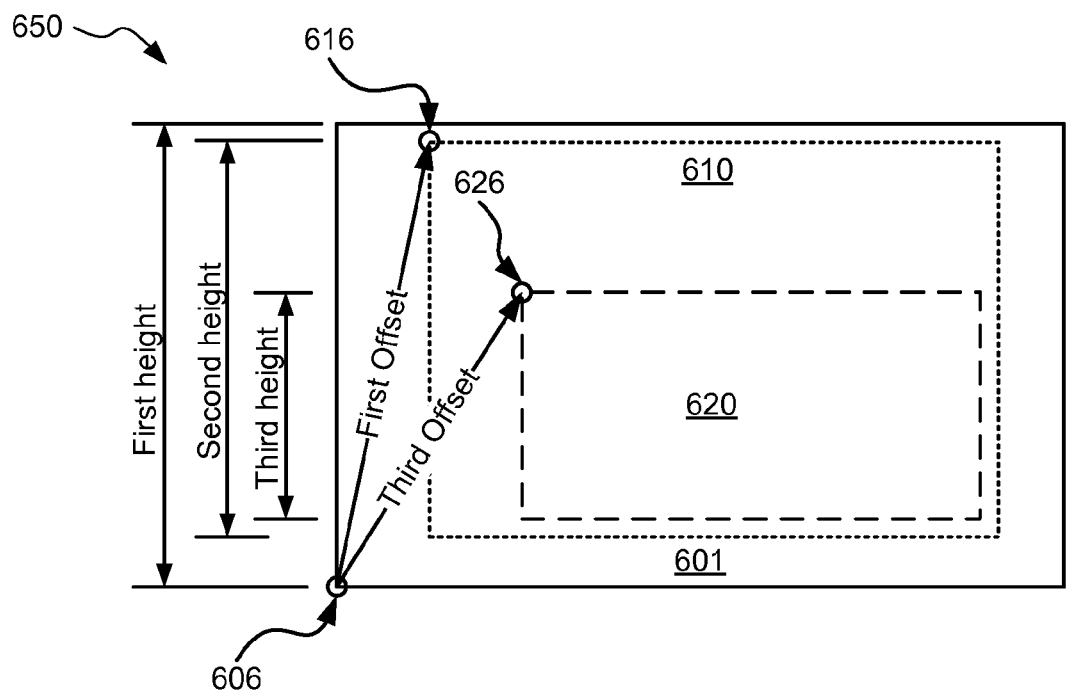

FIG. 6 shows a first image rendition 600 and a second image rendition 650 that demonstrate a position change of a crop box relative to an origin reference point 606 of a selected image. Image rendition 600 contains a selected image 601, a first crop border 610 and a second crop border 620 and has an origin reference point 606, a first crop border reference point 616 and a second crop border reference point 626. Sometimes a crop border is the correct size to display the content a web author wishes to show on a web page, but the crop border is not in the correct position. The crop border may, for example, not include an important feature of the selected image within the edge of the crop border, or may only show part of the important feature. It may be possible to move the crop border to include more or all of the important feature by moving the appropriate crop border reference point (and thus the entire crop border) rather than sequentially adjusting the size of the crop border to correctly position the crop border edges around the important feature in the selected image 601.

For example, a selected image 601 may have an origin reference point 606 located at a vertex of the selected image. This origin reference point may be reassigned by the authoring software to default to any vertex of the selected image, according to aspects of the present disclosure, or may even be located within the edges of the selected image, perhaps at the center of the selected image. A first crop border 610 may overlay the selected image 601, and the first crop border reference point 616 may have a first offset from the origin reference point 606. A second crop border 620 may have a second crop border reference point 626 with a second offset from the origin reference point 606 such that the bottom edge of the second crop border 620 is too far from the bottom edge of the selected image in order to fully contain an important feature of the selected image 601.

Each offset may be characterized by a distance from the origin reference point 606 and a slope or angle of the line between the origin reference point 606 and the reference point of the respective crop border. Offsets may be characterized in Cartesian coordinates using pixels, or by some other measurement system that may be employed by users such as points (a unit applicable to published or printed materials) or metric system measurements (millimeters, centimeters, etc. . . . ). The slope of an offset may be expressed as a pure number, or may be described in terms of an angle measured in degrees from one side of the selected image.

The system or authoring software may receive an input from a user to shift the position of the second crop border reference point 626 relative to the origin reference point 606, as shown in image rendition 650. This input may be received after a user types in a new position in a coordinate system for the second crop border reference point 626, or it may be received by the user using a mouse or touchpad device to select or "grab" the second crop border reference point 626 and move it to a new location by moving the cursor across the selected image using the mouse or touchpad. By changing the position of the second crop border reference point 626, a third offset is created, different from the second offset in length, slope of the offset or angle (relative to the bottom edge of the selected image), or both.

Referring to FIG. 5, the selected image may have a first height, the first crop border may have a second height, and the second crop border may have a third height. However, unlike FIG. 5, the first height, the second height and the third height may remain unchanged after the crop border manipulation is complete. However, in alternative embodiments of reference image manipulations and as described in FIG. 2, the modification of a crop border width, a crop border height, and the repositioning of a crop border reference point relative to the origin reference point may each occur independently of each other, according to aspects of the present disclosure.

Referring to FIGS. 1 through 6, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.\

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    receiving a markup language file, and a style sheet file containing breakpoints and a set of image display rules according to which image renditions of a first image are generated;
    displaying a first image rendition for the first image based on the breakpoints, the first image rendition having:
        the first image; and
        crop borders corresponding to the breakpoints;
    receiving an input indicating a modification to the image rendition;
    displaying a second image rendition that includes the modification to the first image rendition;
    amending the markup language file with at least one image display rule based upon the second image rendition, the at least one image display rule conforming to the set of image display rules;
    presenting on a user interface an option to select an image display strategy to be applied to the first image rendition;
    receiving an instruction via the user interface associated with the image display strategy, the instruction comprising one or more rules for scaling the first image, the instruction saved with the markup language file;
    generating a scaled image by applying the instruction to the first image rendition,
    determining a mismatch between scaled image and the breakpoints, wherein responsive to the mismatch being determined, presenting on the user interface an option to select a second image,
    receiving the selection of the second image,
    replacing the first image with the second image.

2. The method of claim 1, wherein the modification to the first image rendition includes selecting a new image.

3. The method of claim 1, wherein the modification to the first image rendition includes selecting a new breakpoint for the second image rendition.

4. The method of claim 1, wherein the modification to the first image rendition includes changes to the crop borders.

5. The method of claim 1, wherein amending the markup language includes identifying scaling rules that are enumerated in an image style sheet.

6. The method of claim 1, wherein displaying the first image rendition includes displaying a user interface that includes:
    the image rendition based on the first image and the breakpoints; and
    a selection of image display strategies that is selected and applied to the first image rendition.

7. The method of claim 1, wherein the set of image display rules include an image size rule.

* * * * *